United States Patent
Chen et al.

(10) Patent No.: US 11,789,763 B2
(45) Date of Patent: *Oct. 17, 2023

(54) ADAPTIVE AND SECURE BYTECODE INJECTION BASED ON COMPARISON WITH PREVIOUSLY STORED BYTECODE

(71) Applicant: Red Hat, Inc., Raleigh, NC (US)

(72) Inventors: Huamin Chen, Westborough, MA (US); Michael Bursell, Great Yeldham (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,573

(22) Filed: Jul. 29, 2022

(65) Prior Publication Data

US 2022/0365800 A1 Nov. 17, 2022

Related U.S. Application Data

(63) Continuation of application No. 16/744,961, filed on Jan. 16, 2020, now Pat. No. 11,416,273.

(51) Int. Cl.
*G06F 9/455* (2018.01)
*H04L 9/32* (2006.01)
*G06F 21/51* (2013.01)

(52) U.S. Cl.
CPC ........ *G06F 9/45529* (2013.01); *H04L 9/3236* (2013.01); *G06F 9/45508* (2013.01); *G06F 21/51* (2013.01); *H04L 9/3239* (2013.01)

(58) Field of Classification Search
CPC .. G06F 9/45529; G06F 9/45508; G06F 21/51; H04L 9/3236; H04L 9/3239
See application file for complete search history.

(56) References Cited

U.S. PATENT DOCUMENTS

| 6,950,848 | B1 | 9/2005 | Yousefi'zadeh |
| 6,973,646 | B1 | 12/2005 | Bordawekar et al. |
| 6,978,450 | B2 | 12/2005 | Burch |
| 7,814,494 | B1 | 10/2010 | More et al. |

(Continued)

OTHER PUBLICATIONS

Byrro, Renato, "Can We Solve Serverless Cold Starts", published Mar. 20, 2019; retrieved Sep. 3, 2019; pp. 1-7, <https://dashbird.io/blog/can-we-solve-serverless-cold-starts/>.

(Continued)

*Primary Examiner* — Michael W Ayers
(74) *Attorney, Agent, or Firm* — K&L Gates LLP

(57) ABSTRACT

Methods and systems for storing and injecting bytecode are provided. In one embodiment, a method is provided that includes receiving, at a first time, a first function for execution within a serverless computing environment; generating, by an interpreter, a first bytecode based on the first function; storing the first bytecode in association with an identifier of the first function; receiving, at a second time after the first time, a second function for execution within the serverless computing environment; identifying the second function as corresponding to the first function; injecting the first bytecode into a container for execution of the second function; receiving performance metrics regarding execution of the second function; and determining, based on the performance metrics, whether to allow or prevent future injection of the first bytecode.

19 Claims, 7 Drawing Sheets

(56) References Cited

U.S. PATENT DOCUMENTS

| | | |
|---|---|---|
| 9,886,374 B1 | 2/2018 | Kuo et al. |
| 10,063,595 B1 | 8/2018 | Qureshi et al. |
| 10,303,582 B2 | 5/2019 | Fink et al. |
| 11,082,333 B1 | 8/2021 | Lam et al. |
| 2004/0230958 A1 | 11/2004 | Alaluf |
| 2005/0252977 A1 | 11/2005 | Grazes et al. |
| 2007/0288909 A1* | 12/2007 | Cheung ................. G06F 9/3879 717/136 |
| 2011/0283263 A1 | 11/2011 | Gagliardi et al. |
| 2015/0046911 A1* | 2/2015 | Lebert .................... G06F 8/443 717/152 |
| 2016/0291951 A1 | 10/2016 | Dahan |
| 2018/0101403 A1 | 4/2018 | Baldini Soares et al. |
| 2019/0028552 A1 | 1/2019 | Johnson, II et al. |
| 2019/0075154 A1 | 3/2019 | Zhang et al. |
| 2019/0213326 A1 | 7/2019 | Dykes |
| 2020/0210216 A1 | 7/2020 | Boilen et al. |

OTHER PUBLICATIONS

Lin et al.,"Mitigating Cold Starts in Serverless Platforms a Pool-Based Approach", Mar. 28, 2019; pp. 1-5.

* cited by examiner

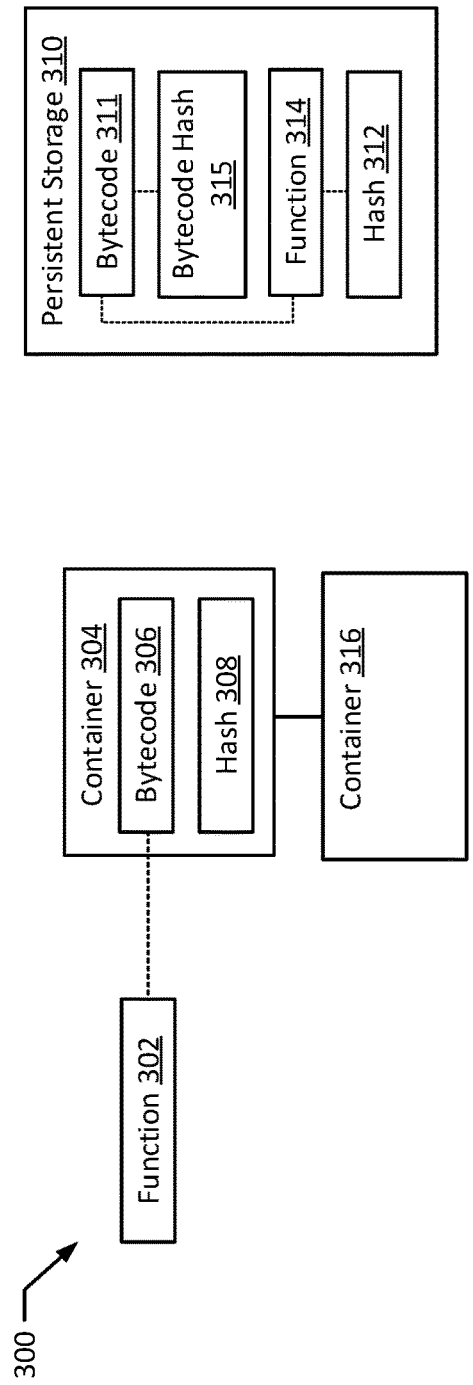
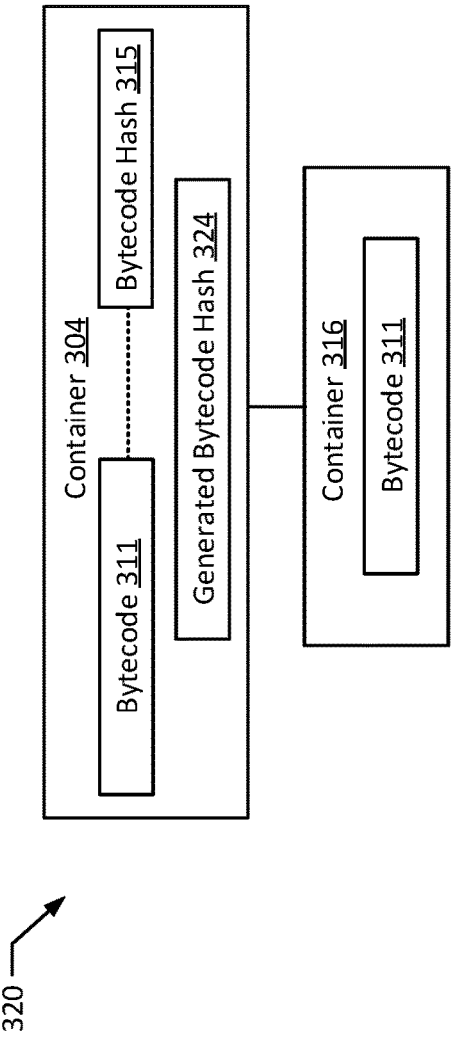
FIG. 3A
FIG. 3B

US 11,789,763 B2

ADAPTIVE AND SECURE BYTECODE INJECTION BASED ON COMPARISON WITH PREVIOUSLY STORED BYTECODE

CROSS-REFERENCE TO RELATED APPLICATIONS

This application is a continuation of U.S. patent application Ser. No. 16/744,961, entitled "ADAPTIVE AND SECURE BYTECODE INJECTION BASED ON COMPARISON WITH PREVIOUSLY STORED BYTECODE," filed Jan. 16, 2020, the entire contents of which are incorporated herein by reference herein and relied upon.

BACKGROUND

Computing systems may rely on agile computing environments to execute one or more functions and/or computing services. Agile computing environments may provide computing resources that can be used by the computing systems to execute the functions and/or computing services. In particular, the agile computing environments may allocate a portion of the computing resources (e.g., processing, storage, input/output resources) to execute requested functions and/or computing services.

SUMMARY

The present disclosure presents new and innovative systems and methods for storing and injecting bytecode. In one embodiment, a method is provided that includes receiving, at a first time, a first function for execution within a serverless computing environment and generating, by an interpreter, a first bytecode based on the first function. The method may also include storing the first bytecode in association with an identifier of the first function. At a second time after the first time, a second function may be received for execution within the serverless computing environment and the second function may be identified as corresponding to the first function. The method may further include retrieving the first bytecode and injecting the first bytecode into a container for execution of the second function.

In another embodiment, system is provided that includes a processor and a memory. The memory may store instructions which, when executed by the processor, cause the processor to receive, at a first time, a first function for execution within a serverless computing environment and generate, by an interpreter, a first bytecode based on the first function. The memory may also store instructions which, when executed by the processor, cause the processor to store the first bytecode in association with an identifier of the first function. The memory may store additional instructions which, when executed by the processor, cause the processor to receive, at a second time after the first time, a second function for execution within the serverless computing environment and identify the second function as corresponding to the first function. The memory may store further instructions which, when executed by the processor, cause the processor to retrieve the first bytecode and inject the first bytecode into a container for execution of the second function.

In a further embodiment, a non-transitory, computer-readable medium is provided storing instructions which, when executed by a processor, cause the processor to receive, at a first time, a first function for execution within a serverless computing environment and generate, by an interpreter, a first bytecode based on the first function. The non-transitory, computer-readable medium may also store instructions which, when executed by a processor, cause the processor to store the first bytecode in association with an identifier of the first function. The non-transitory, computer-readable medium may store additional instructions which, when executed by a processor, cause the processor to receive, at a second time after the first time, a second function for execution within the serverless computing environment and identify the second function as corresponding to the first function. The non-transitory, computer-readable medium may store further instructions which, when executed by a processor, cause the processor to retrieve the first bytecode and inject the first bytecode into a container for execution of the second function.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIGS. 3A-3B illustrate a bytecode injection procedure according to exemplary embodiments of the present disclosure.

DETAILED DESCRIPTION OF EXAMPLE EMBODIMENTS

Figure 1:
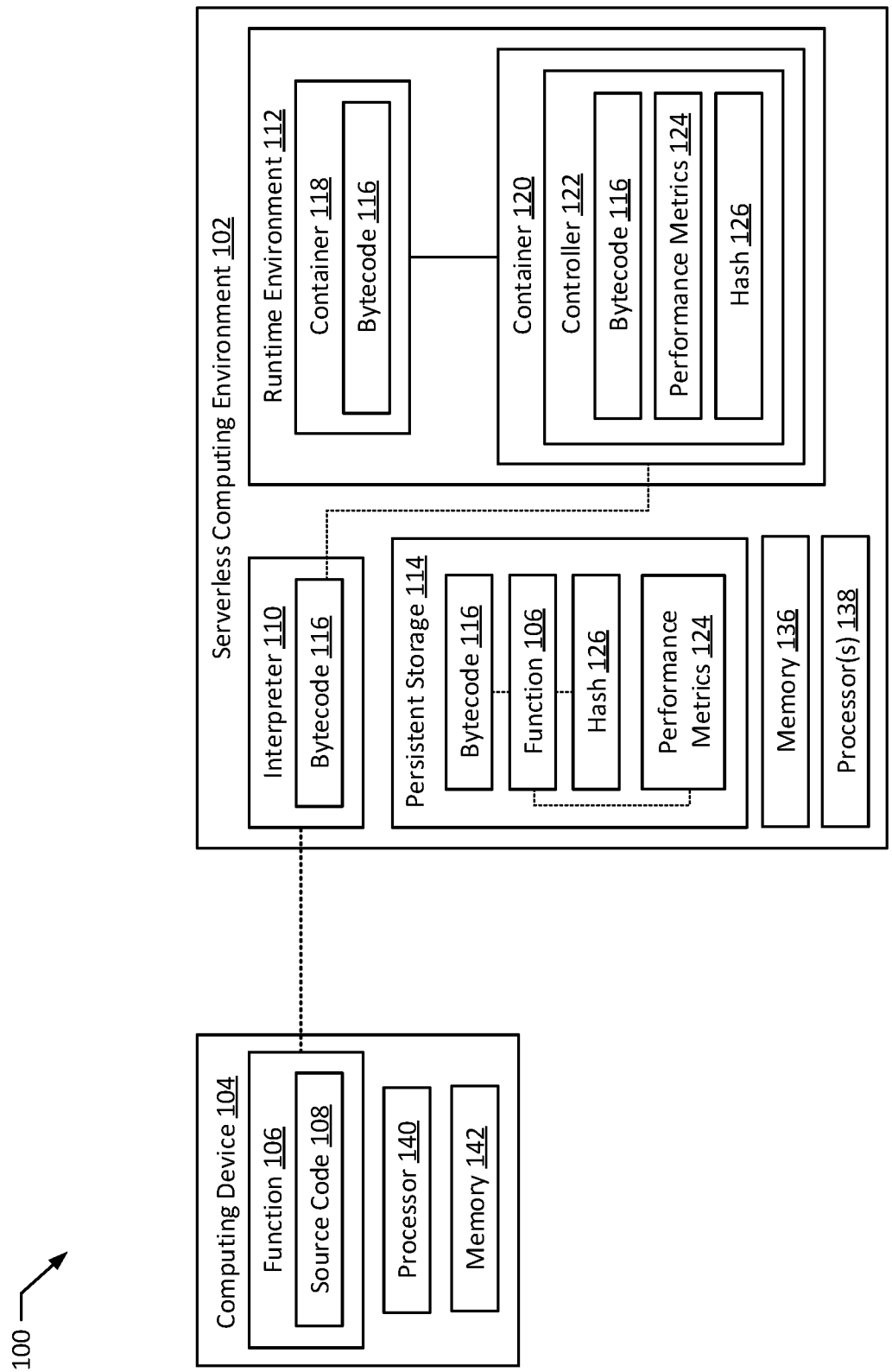
FIG. 1 illustrates a system according to an exemplary embodiment of the present disclosure.

Computing environments such as agile computing environments that provide computing resources to other computing systems (e.g., by a cloud computing infrastructure) typically include multiple computing units with associated computing resources, such as processors, memory, hard disks, and/or graphical processing units. The computing environments may provision the computing resources from among the computing units to computing systems requesting execution of functions associated with the computing systems. To allocate the computing resources, the computing environments typically rely on virtualization. Virtualizing the computing resources may abstract the specific computing unit and/or specific piece or portion of computing hardware that a requesting computing system is allocated. Virtualization may allow functions to be split up between multiple pieces of hardware (e.g., multiple processors, multiple processor cores, multiple memories). Further, the functions may also be split up between computing hardware on different computing units. Overall, virtualization may allow computing environments to increase overall resource utilization among the computing units while also reducing the complexity for requesting computing systems, which do not have to configure the specific computing resources allocated for execution of functions. However, virtualizing computing resources can reduce overall function execution speed. For example, virtualized computing resources typically execute functions slower, as fewer overall computing resources of the computing units are available for function execution. In particular, virtualization of computing resources requires a certain level of computing overhead to run and support the virtualization system, which reduces the overall availability of computing hardware and increases the latency of the computing resources of the computing units.

To address the above shortcomings of virtualized computing environments, other techniques for provisioning computing resources in a computing environment include directly provisioning specific pieces or portions of the computing hardware of the computing units (e.g., "composable infrastructure"). For example, one or more cores of a processor and/or a predefined amount of memory may be allocated to execute a specific function. In such implementations, the serverless computing environment may receive functions for execution. These functions may be repetitive and short-lived. For example, a function may be received, loaded into a container of the serverless computing environment, may execute, and may then exit and close the container until a request is received to execute the function again. Because the functions are short-lived, they can be easily executed in parallel and may be more usable and portable between different types of serverless computing environments. However, these functions can also have higher latency. In particular, serverless functions may have to be interpreted from higher-level programming languages into lower-level bytecode that is executable by the serverless computing environment. Generating this bytecode increases the latency of the function (e.g., the time to begin executing the function) because the bytecode needs to be generated before execution can begin.

Therefore, there exists a need to reduce the time required to initialize the bytecode and initialize execution of functions in a serverless computing environment. One solution to this problem is to generate bytecode for received functions and to store the bytecode for later use. When functions are received at later times, the stored bytecode may be analyzed for previously-stored bytecode originating from corresponding functions (e.g., the same or similar functions). If previously-stored bytecode originating from corresponding functions is found, the bytecode may be injected into a container for use in executing the function. Prior to injecting the bytecode, however, the bytecode may be analyzed to ensure that the bytecode was not altered (e.g., intentionally or erroneously altered) during storage. If the bytecode is altered, the bytecode may be prevented and new bytecode may be generated for the function. Further, after the bytecode is injected, performance of the function may be monitored to ensure that injecting the previously-generated bytecode actually improves execution of the function. If not, injection of the bytecode may be prevented for future executions of the function.

FIG. 1 illustrates a system 100 according to an exemplary embodiment of the present disclosure. The system 100 may be configured to receive functions for execution, store bytecode used to execute the functions, and responsively inject stored bytecode for future executions of the functions. The system 100 includes a serverless computing environment 102 and a computing device 104. The serverless computing environment 102 may be configured to receive and execute functions. For example, the serverless computing environment 102 may receive functions 106 from the computing device 104. The functions 106 may include source code 108 specifying actions to perform when executing the function 106.

The serverless computing environment 102 includes an interpreter 110, a runtime environment 112, and persistent storage 114. The interpreter 110 may be configured to generate bytecode 116 based on received functions 106. For example, in certain implementations, the source code 108 may include stored programming instructions prepared in an interpretive programming language (e.g., JavaScript®, Python q. Such interpretive programming languages may not store instructions with the requisite specificity to enable execution of the function 106 by the serverless computing environment 102. Accordingly, prior to execution, the interpreter 110 may generate bytecode 116 based on the source code 108 that is executable by the serverless computing environment 102 to perform the function 106.

The runtime environment 112 may be configured to receive the bytecode 116 generated by the interpreter 110 and to execute the bytecode 116 order to perform the function 106. In particular, the runtime environment may create containers 118 configured to receive and execute the bytecode 116. The runtime environment 112 may additionally include a container 120 configured to intercept the bytecode 116 from the interpreter 110. In particular, the container 120 may implement a controller 122 configured to intercept the bytecode 116 transmitted from the interpreter 110 to the container 118. After intercepting the bytecode 116, the container 120 may transmit the bytecode 116 to the container 118 for execution as described above. In certain implementations, the interpreter 110 may be configured to "stream" bytecode for execution by the runtime environment 112. For example, the interpreter 110 may be configured to progressively generate and transmit portions of the bytecode 116 (e.g., partial bytecode) based on portions of the source code 108. The controller 122 may receive and store the portions of the bytecode 116 before transmitting the portions of the bytecode 116. The controller 122 may also generate a hash 126. The hash 126 may be generated to uniquely identify the bytecode 116. For example, the hash 126 may be generated at least in part based on the bytecode 116. For example, after the bytecode 116 is completely generated by and received from the interpreter 110, the controller 122 may generate the hash 126 based on the contents of the complete bytecode 116. The bytecode 116 may additionally or alternatively be generated at least in part based on an identifier of the function 106 and/or the source code 108. The controller 122 may further monitor execution of the bytecode 116 by the container 118 and may store performance metrics 124 indicative of the execution. For example, the performance metrics 124 may include one or more of a time to initial execution of the bytecode 116, a total execution time of the bytecode 116, a processor utilization during execution of the bytecode 116, and a memory utilization during execution of the bytecode 116.

The containers 118, 120 may be implemented as container images according to various cloud infrastructure protocols. For example, the containers 118, 120 may be implemented according to one or more of the Docker®, Knative®, Kubernetes, and AWS® Fargate protocols. Each container 118, 120 may be allocated a portion of the hardware managed by the serverless computing environment 102. For example, each container 118, 120 may be allocated at least a portion of the memory 136 and the processor(s) 138. In certain implementations, more than one container 118 may be created to execute the function 106. For example, the computing device 104 may request that the function be executed multiple times and the serverless computing environment 102 may correspondingly create multiple containers 118 to execute the function 106 multiple times in parallel. In such implementations, each of the containers 118 may receive the bytecode 116. Further, in such implementations, the container 120 may intercept the bytecode 116 to at least a portion of the containers 118 created to execute the function 106. For example, the container 120 may intercept the bytecode 116 to one of the containers 118, a subset of the containers 118, and/or all of the containers 118. Further, in certain implementations, multiple containers 120 may be created to intercept bytecode 116 for the containers 118. For example, each container 120 may intercept bytecode 116 for one of the containers 118, a subset of the containers 118, and/or all of the containers 118. Furthermore, the container 120 may be implemented as a secondary container, such as a sidecar container, of the container 118 (e.g., as a container that is subordinate to and runs alongside the container 118). Implementing the container 120 as a sidecar container may improve compatibility with serverless computing environment infrastructure and may avoid the need to substantially alter the infrastructure of the serverless computing environment 102 (e.g., by adding or removing low-level processes that operate outside of the runtime environment 112). Also, the containers 118, 120 may, in certain implementations, be deleted or removed from the runtime environment 112 after execution of the function 106 is complete.

The persistent storage 114 may be configured to store information for periods of time lasting longer than the execution of individual functions 106. For example, the persistent storage 114 may be configured to store data used across multiple executions of the same function 106 and/or multiple executions of different functions by the serverless computing environment 102 (e.g., by the runtime environment 112). The controller 122 may be configured to store one or more of the bytecode 116, the performance metrics 124, and the hash 126 in the persistent storage 114. For example, after detecting that execution of the bytecode 116 and the function 106 is completed by the container 118 (e.g., after detecting removal and/or a removal request of the container 118), the controller 122 may store the bytecode 116, the performance metrics 124, and the hash 126 in the persistent storage 114 along with an identifier of the function 106, as depicted in FIG. 1. After storing the above data in the persistent storage 114, the container 120 may be removed from the environment 112. As will be explained further below, the bytecode 116, function 106, hash 126, and performance metrics 124 may be used in subsequent executions of the function 106. In particular, upon receiving a subsequent request to execute a function, the serverless computing environment 102 (e.g., a controller executing within the runtime environment 112) may determine that the bytecode 116 stored in the persistent storage 114 corresponds to the requested function and may retrieve the bytecode 116 from the persistent storage 114 and inject the bytecode 116 into a container for execution within the runtime environment 112. Injecting the bytecode in this way may reduce the bytecode needs to be generated by the interpreter 110 prior to beginning execution of the function 106, thereby improving time to execution, latency, and system responsiveness of the function 106.

One or more of the computing device 104 and the serverless computing environment 102 may be implemented by a computer system. For example, the processors 138, 140 and memories 136, 142 may implement one or more features of the computing device 104 and/or the serverless computing environment 102. In particular, the memories 136, 142 may contain instructions which, when executed by the processors 138, 140, cause the processors 138, 140 to perform one or more of the operational features of the serverless computing environment 102 and/or the computing device 104.

Figure 2A:
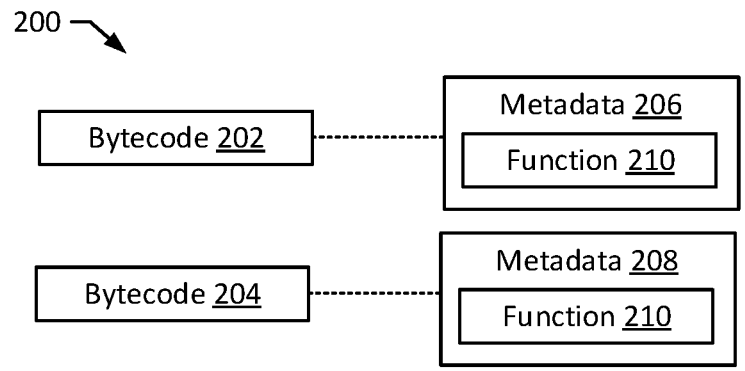
FIGS. 2A-2C illustrate function identification procedures according to exemplary embodiments of the present disclosure.
Figure 2B:
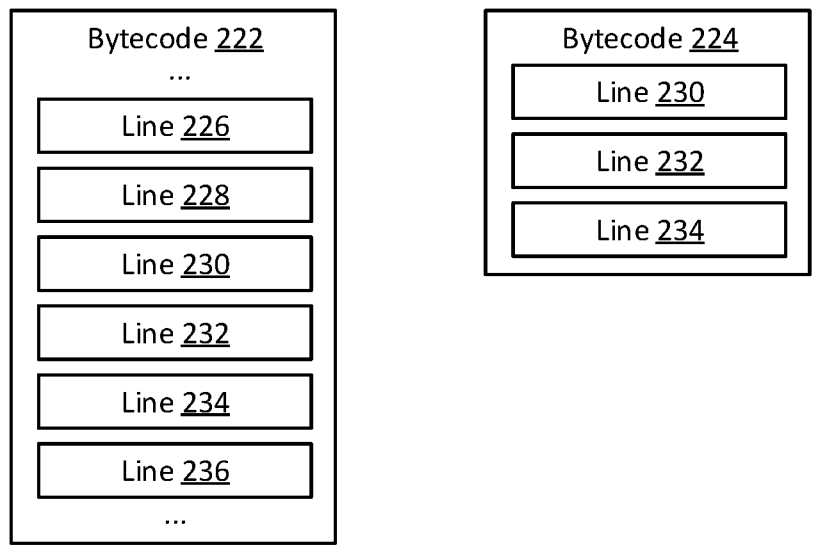
Figure 2C:
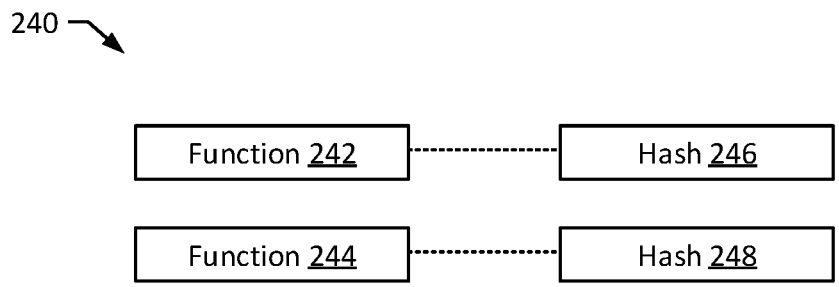

FIGS. 2A-2C illustrate function identification procedures 200, 220, 240 according to exemplary embodiments of the present disclosure. The function identification procedures 200, 220, 240 may be performed to identify stored functions corresponding to the newly-received functions for execution. For example, the serverless computing environment 102 may perform one or more of the function identification procedures 200, 220, 240 in order to identify a function stored within the persistent storage 114 that corresponds to a function received from the computing device 104 for execution within the runtime environment 112. In particular, the identified function stored within the persistent storage 114 may include bytecode 116 stored in the persistent storage 114 that can be injected into a container in order to execute the received function. In certain implementations, the function identification procedures 200, 220, 240 may be performed by a controller 122 within the runtime environment 112 of the serverless computing environment 102.

In certain implementations, corresponding functions may be identified by comparing metadata associated with bytecode received from the interpreter 110. For example, in FIG. 2A, the function identification procedure 200 includes bytecodes 202, 204 corresponding to metadata 206, 208. The metadata 206, 208 identifies the functions 210 from which the bytecodes 202, 204 were generated. For example, the metadata 206, 208 may include unique identifiers of the functions 210, such as a function name, process identifier, or hash of the function 210. In certain implementations, the metadata 206, 208 may be transmitted to the controller 122 by the interpreter 110 in association with bytecode 202, 204 is the interpreter 110 generates the bytecode 202, 204 from the source code 108 survey received function. As the controller 122 receives the bytecode 202, 204 and the metadata 206, 208 from the interpreter 110, the controller 122 may compare the received metadata 206, 208 to metadata stored in the persistent storage 114 in order to identify a corresponding function stored within the persistent storage 114. For example, the bytecode 202 and the metadata 206 may be received from the interpreter 110 and the bytecode 204 and the metadata 208 may be stored on the persistent storage 114. After receiving the metadata 206 identifying the function 210 from the interpreter 110, the controller 122 may search the persistent storage and identify the metadata 208 that also identifies the function 210. Because both metadata 206, 208 identify the same function 210, the controller 122 may identify the bytecode 204 as corresponding to the bytecode 202. In certain implementations, the bytecode 202 in the metadata 206 may be received from the interpreter 110 before the bytecode 202 is completely generated from the received function. Accordingly, the corresponding bytecode 204 may be identified, retrieved, and injected in a shorter time than to be required to finish generating the bytecode 202. In this way, time to initial execution of the function 210 may be reduced, improving responsiveness of the execution of the function 210 and reducing the computing resources necessary to finish generating the bytecode 202.

In further implementations, corresponding functions may be identified by comparing the bytecode generated for each function. For example, in FIG. 2B, the function identification procedure 220 includes bytecodes 222, 224. The bytecode 222 includes lines 226-236 and the bytecode 224 includes lines 230, 234. The lines 226, 236 may represent lines of bytecode and/or machine code specifying instructions that are executable by the runtime environment 112. Corresponding functions may be identified by determining that bytecode that is being generated includes one or more of the same lines as a bytecode that is stored on the persistent storage 114. For example, the controller 122 may receive the bytecode 224 from the interpreter 110 in the bytecode 222 may be stored on the persistent storage 114 (e.g., after being previously generated by the interpreter 110). In particular, the bytecode 224 may be a partial bytecode for a received function generated by the interpreter 110 (e.g., as the interpreter streams partial bytecode to a container 118 of the runtime environment 112 for execution). After receiving the bytecode 224, the controller 122 may identify the lines the controller 122 may then search the persistent storage 114 for bytecode containing the same or similar lines 230-234 (e.g., identical lines and/or lines sharing a predetermined percentage or proportion of content and/or instructions). The controller 122 may determine that the bytecode 222 also contains the lines 230-234 (in addition to other lines 226, 228, 236). Because the bytecode 222 contains the same or similar lines 230-234 as the bytecode 224, the controller 122 may determine that the bytecode 222 corresponds to the bytecode 224. As described above in connection with the function identification procedure 200, the bytecode 222 may be identified and received faster than generation of the bytecode 224 can be completed. Accordingly, the bytecode 224 may be injected to more quickly begin execution of a received function, thereby improving system responsiveness and reducing the computing resources necessary to finish generating the bytecode 224.

In still further implementations, corresponding functions may be identified based on unique identifiers associated with functions. For example, in FIG. 2C, the function identification procedure 240 includes functions 242, 244 and hashes 246, 248 associated with the functions 242, 244. The hashes 246, 248 may be exemplary implementations of unique identifiers of the corresponding functions 242, 244. The hashes 246, 248 may be generated based on all or part of the contents of the functions (e.g., names, process identifiers, and/or source code contained within the functions 242, 244). As explained above, hashes 246, 248 may be generated using one or more hashing techniques. In certain implementations, unique identifiers other than hashes 246, 248 may be utilized. For example, in addition or alternative to the hashes 246, 248, the functions 242, 244 may include corresponding function names, process identifiers, directories, user groups, storage locations, and/or source computing devices, any of which may be used individually or in combination to uniquely identify the functions 242, 244. In certain implementations, the hashes 246, 248 and/or other unique identifiers may be utilized to determine that the function 244 corresponds to the function 242. For example, the function 242 may be received for execution by the serverless computing environment 102 and the function 244 and hash 248 may be stored in the persistent storage 114. After receiving the function 242, the controller 122 may generate the hash 246 according to a predetermined hashing technique (e.g., the same hashing technique utilized to generate the hash 248 function 244). The controller 122 may then search the persistent storage 114 for a hash 248 that matches (e.g., is identical to) the hash 246. After determining that the hash 248 matches the hash 246, the controller 122 may determine that the function 244 corresponds to the function 242. The controller 122 may then retrieved bytecode stored in association with the function 244 from the persistent storage 114. As described above in connection with the function identification procedures 200, 220, the bytecode associated with the function 244 may be identified, retrieved, and injected faster than bytecode may be generated from the function 242. Accordingly, retrieving the bytecode in this fashion may reduce the time to execution for the received function 242, improving system responsiveness introducing the computing resources necessary to initialize execution of the function 242.

FIGS. 3A-3B illustrate a bytecode injection procedure according to exemplary embodiments of the present disclosure. The bytecode injection procedure includes states 300, 320. The state 300 includes a function 302, containers 304, 316, and a persistent storage 310. The persistent storage 310 may be configured to store bytecode 311 utilized in earlier executions of functions 314. For example, the persistent storage 310 may be an exemplary implementation of the persistent storage 114 and may receive and store bytecode 311 in association with hashes 312 and/or functions 314 from containers 120 within the runtime environment 112 of the serverless computing environment 102.

The container 316 may be implemented within the runtime environment 112 for execution of the function 302, which may be received from a computing device for execution by the serverless computing environment 102. For example, the container 316 may be an exemplary implementation of the container 118. The container 304 may be implemented within a runtime environment 112 to intercept bytecode 306 generated by the interpreter 110 and to identify and provide bytecode to the container 316 for execution. For example, the container 304 may be an exemplary implementation of the container 120 and may perform one or more functions using a controller such as the controller 122.

As depicted, after the function 302 is received, the container 304 may initially receive the bytecode 306 from the interpreter 110 (e.g., a partial bytecode generated based on a portion of the function 302). The container 304 may also receive a copy of the function 302 (e.g., in metadata received in association with the bytecode 306) and may generate a hash 308 based on the function 302 using techniques similar to those discussed above in connection with the hashes 126, 246, 248. The container 304 may then search the persistent storage 310 for bytecode from a function that corresponds to the function 302. For example, the container 304 may search the persistent storage 310 and determine that the hash 312 matches the hash 308 and therefore that the function 314 corresponds to the function 302.

As shown in the state 320, the container 304 may then retrieve the bytecode 311 and a bytecode hash 315 from the persistent storage 310. For example, the persistent storage 310 may store both a hash 312 generated based on the function and a bytecode hash 315 generated based on the contents of the bytecode 31. The container 304 may then generate a generated hash 324 based on the bytecode 311 received from the persistent storage 310. The generated hash 324 may be generated using the same hashing techniques that were used to generate the bytecode hash 315. For example, the generated bytecode hash 324 may be generated based solely on the contents of the bytecode 311 and/or may be generated based on the contents bytecode 311 and one or more of the hashes 308, 312 and identifiers of the function 314. Other techniques for generating the bytecode hash 315 and the generated bytecode hash 324 may be possible. The container 304 may then compare the generated bytecode hash 324 to the bytecode hash 315. Because the generated bytecode hash 324 is generated using the same hashing techniques that were used to generate the bytecode hash 315, if the contents of the bytecode 311 received from the persistent storage 310 are unaltered from when the bytecode hash 315 was initially generated, the generated bytecode hash 324 will match the bytecode hash 315. However, if the contents of the bytecode 311 have been altered, the generated bytecode hash 324 will differ from the bytecode hash 315. Therefore, if the container 304 determines that the generated bytecode hash 324 matches the bytecode hash 315, the container 304 may determine that the bytecode 311 has not been altered and may therefore transmit the bytecode 311 (e.g., "inject" the bytecode 311) to the container 316 as depicted in the state 320.

In this way, the container 304 may ensure that only authentic and unaltered bytecode is injected prior to beginning execution of functions 302 that are received. In certain instances, bytecode 311 stored in the persistent storage 310 may change (e.g., may be nefariously changed by malicious actors and/or malicious programs, may be inadvertently changed due to storage errors and/or degradation). It may be desirable to prevent execution of bytecode 311 that has changed (e.g., to prevent execution of incorrect or inaccurate bytecode, to prevent execution of nefarious bytecode). Therefore, by storing a bytecode hash 315 of the bytecode 311 when the bytecode 311 is initially stored on the persistent storage 310 and by generating and comparing the generated bytecode 324 to the bytecode hash 315, the container 304 may prevent injection and execution of bytecode 311 that has been changed while still allowing injection of bytecode 311 that has not been changed. In this way, the container 304 may enable improved security by preventing execution of altered and/or compromised bytecode while also enabling the above-discussed performance improvements of bytecode retrieval and injection.

Figure 4:
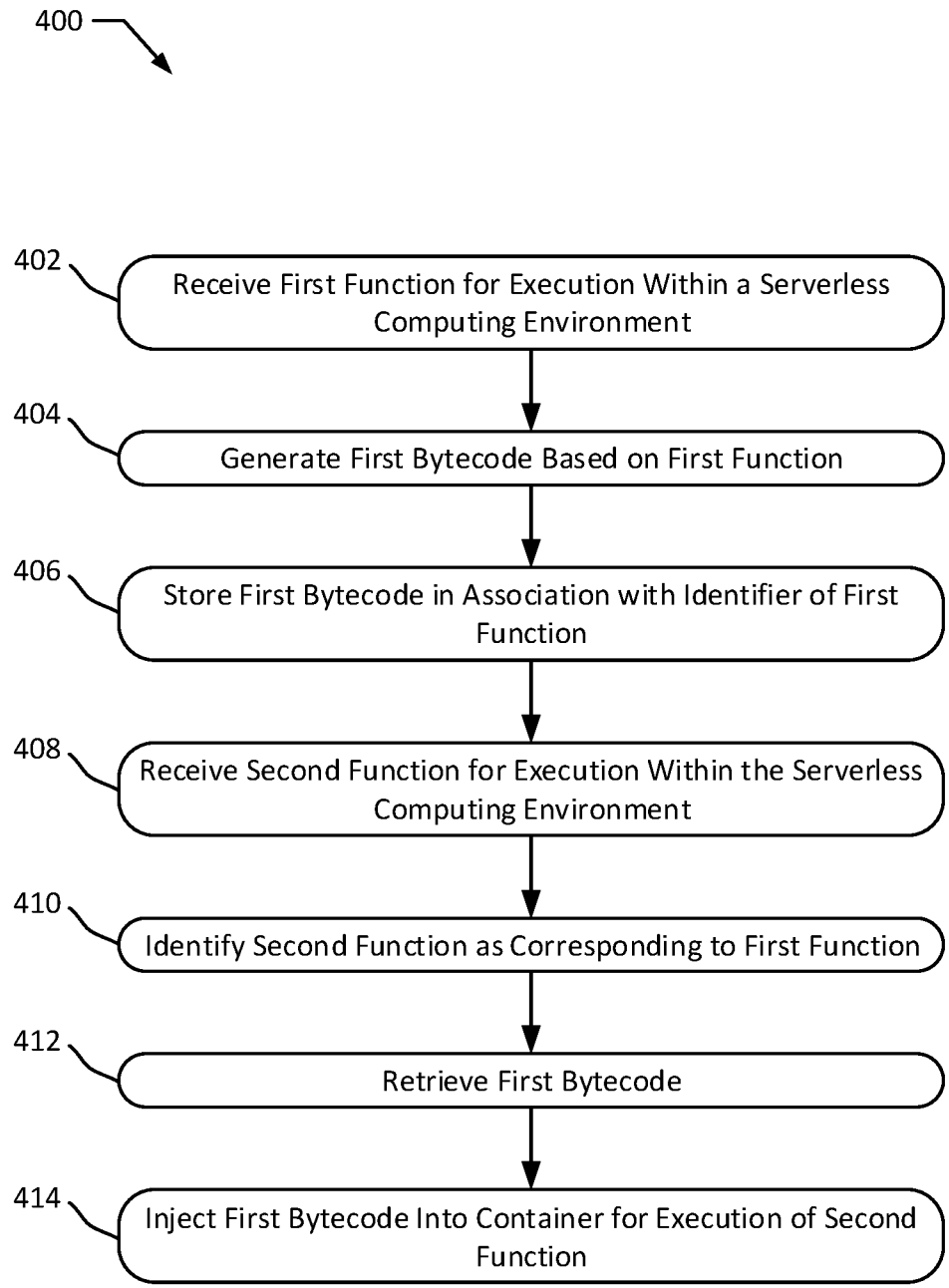
FIG. 4 illustrates a method for adaptive and secure bytecode injection according to an exemplary embodiment of the present disclosure.

FIG. 4 illustrates a method 400 for adaptive and secure bytecode injection according to an exemplary embodiment of the present disclosure. The method 400 may be implemented on a computer system, such as the system 100. For example, the method 400 may be implemented by the serverless computing environment 102 and in particular may be implemented by the interpreter 110 and the runtime environment 112 (e.g., containers within the runtime environment 112). The method 400 may also be implemented by a set of instructions stored on a computer readable medium that, when executed by a processor, cause the computer system to perform the method 400. For example, all or part of the method 400 may be implemented by the processor(s) 138 and the memory 136. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a first function for execution within a serverless computing environment (block 402). For example, the serverless computing environment 102 may receive a function 106 for execution within the serverless computing environment 102. As explained previously the functions 106 may be received at an interpreter 110 of the serverless computing environment.

First bytecode may then be generated based on the first function (block 404). For example, the interpreter 110 may generate a bytecode 116 based on the function 106 that is received. As explained above, the function 106 may include source code 108 specifying actions necessary to execute the function 106, but the source code 108 may not itself be executable by the runtime environment 112. Therefore, the interpreter 110 may generate bytecode 116 based on the source code 108 and the bytecode 116 may include lines of instructions that are executable by the runtime environment 112. In particular, the runtime environment 112 may include a container 118 created to execute the function 106 and the interpreter 110 may transmit, stream, or otherwise provide the bytecode 116 to the runtime environment 112 for execution within the container 118.

The first bytecode may be stored in association with an identifier of the first function (block 406). For example, the bytecode 116 may be stored in the persistent storage 114 in association with an identifier of first function 106. For example, the bytecode 116 generated by the interpreter 110 and transmitted to the container 118 may be intercepted by a different container 120 (e.g., a sidecar container of the container 118). The container 120 may implement a controller 122 which, as discussed above, may store a copy of the bytecode 116 received from the interpreter 110 and may provide the bytecode 116 to the container 118 for execution. Once a complete copy of the bytecode 116 is generated by and received from the interpreter 110, the controller 122 may store the bytecode 116 on the persistent storage 114 for subsequent use. The bytecode 116 may be stored in association with an identifier of the function 106 (e.g., metadata, a function name, a process identifier, a hash of the function 106), as discussed above.

A second function may be received for execution within the serverless computing environment (block 408). For example, the serverless computing environment 102 may receive a second function 242, 302 for execution. The second function 242, 302 may be received at a time after receiving the first function 106 (e.g., after the bytecode 116 has been generated and stored and/or after execution of the first function 106 has completed). The second function 242, 302 may be received from the same computing device 104 as the first function 106 and/or may be received from a different computing device.

The second function may be identified as corresponding to the first function (block 410). For example, the serverless computing environment 102 may identify the second function 242, 302 as corresponding to the first function 106. As discussed in further detail above, the second function 242, 302 may be identified as corresponding to the first function 106 by comparing one or more of metadata identifying the first and second functions 106, 242, 302, bytecode generated based on the first and second functions 106, 242, 302, and hashes generated based on the first and second functions 106, 242, 302. In particular, the second function 242, 302 may be identified as corresponding to the first function 106 according to any of the function identification procedures 200, 220, 240 discussed above. In certain implementations, a controller may identify that the second function 242, 302 corresponds to the first function 106. For example, after receiving the second function 242, 302 for execution, the serverless computing environment 102 may create a container for execution of the second function 242, 302. When the container for execution of the second function 242, 302 is created, a second container (e.g., a sidecar container) may be created that implements a controller similar to the controller 122. The controller may receive one or more of the second function 242, 302, an identifier of the second function 242, 302, bytecode generated by the interpreter 110 based on the second function 242, 302, and/or a hash generated based on the second function 242, 302. The controller may proceed to identify the second function 242, 302 as corresponding to the first function 106 based on the received information. In particular, the controller 122 may search the persistent storage 114 for a function that corresponds to the second function 242, 302 and may identify that the first function 106 stored on the persistent storage 114 corresponds to the second function 242, 302.

The first bytecode may be retrieved (block 412). For example, the serverless computing environment 102 may retrieve the bytecode 116. In particular, the controller may retrieve the bytecode 116 corresponding to the first function 106 from the persistent storage 114 of the serverless computing environment 102. The first bytecode may be injected into a container for execution of the second function (block 414). For example, the serverless computing environment 102 may inject the bytecode 116 into a container created within the runtime environment 112 for execution of the second function 242, 302. In particular, after retrieving the bytecode 116 from the persistent storage 114, the controller 122 may inject the bytecode 116 by transmitting the bytecode 116 to the container for execution.

As explained above, by retrieving and injecting previously-generated bytecode 116, the serverless computing environment 102 may reduce the time to initial execution of the second function 242, 302. Accordingly, performing the method 400 may enable the serverless computing function 102 to execute received functions faster, improving system responsiveness to function execution requests. Further, by reducing the frequency with which bytecode needs to be generated, the method 400 may reduce the proportion of system resources for the serverless computing environment 102 that are used to generate bytecode, freeing up additional system resources for use in executing functions. Additionally, because many aspects of the method 400 (e.g., blocks 406, 410, 412, 414) may be performed within a sidecar container of the runtime environment 112, the method 400 may be performed within serverless computing environment implementations without having to create additional low-level infrastructure systems to perform the bytecode identification, retrieval, and injection.

Figure 5A:
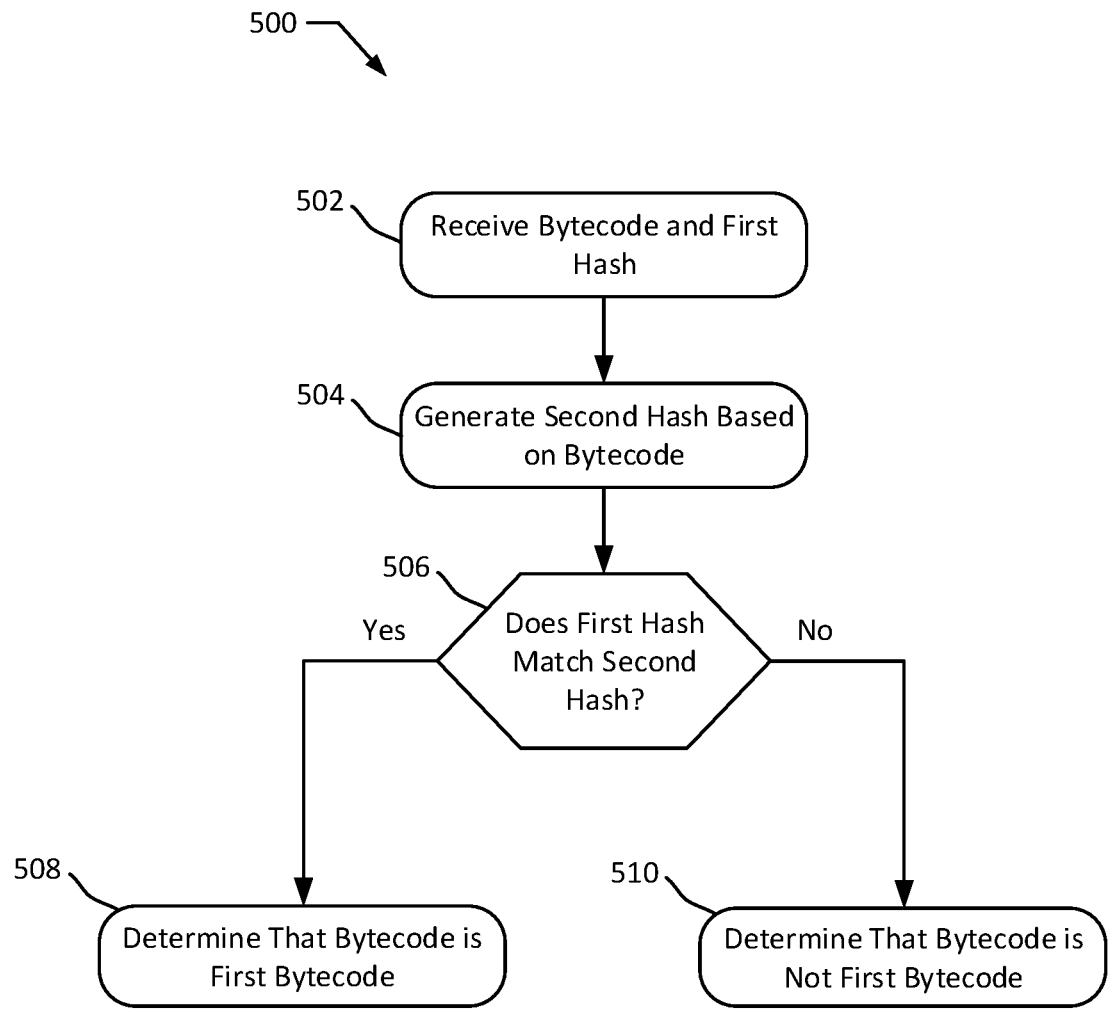
FIG. 5A illustrates a method for secure bytecode retrieval according to an exemplary embodiment of the present disclosure.

FIG. 5A illustrates a method 500 for secure bytecode retrieval according to an exemplary embodiment of the present disclosure. The method 500 may be implemented on a computer system, such as the system 100. For example, the method 500 may be implemented by the serverless computing environment 102 and in particular may be implemented by the runtime environment 112 (e.g., containers within the runtime environment 112). In certain implementations, the method 500 may be implemented as part of the method 400. For example, the method 500 may be performed while retrieving the first bytecode at block 412 and/or before injecting the first bytecode at block 414. The method 500 may also be implemented by a set of instructions stored on a computer readable medium that, when executed by a processor, cause the computer system to perform the method 500. For example, all or part of the method 500 may be implemented by the processor(s) 138 and the memory 136. Although the examples below are described with reference to the flowchart illustrated in FIG. 5A, many other methods of performing the acts associated with FIG. 5A may be used. For example, the order of some of the blocks may be changed, certain blocks may be combined with other blocks, one or more of the blocks may be repeated, and some of the blocks described may be optional.

The method 500 may begin with receiving bytecode and a first hash (block 502). For example, and as discussed above in connection with FIGS. 3A-B, a bytecode 311 and a bytecode hash 315 may be received from a persistent storage 310 of the serverless computing environment 102. As explained above in connection with the method 400, the bytecode 311 may be previously-generated based on a first function 106 that corresponds to a second function 242, 302 received by the serverless computing environment 102 for execution. The first hash may be a bytecode hash, such as the bytecode hash 315, generated based on the contents of the bytecode 311. In particular, the bytecode hash 315 may be generated prior to storage of the bytecode 311 and the bytecode hash 315 within the persistent storage 310.

A second hash may be generated based on the bytecode (block 504). For example, a generated bytecode hash 324 may be generated based on the bytecode 311 (e.g., the contents of the bytecode 311) received from the persistent storage 310. The generated bytecode hash 324 may be generated using the same hashing techniques used to generate the bytecode hash 315 based on the bytecode 311.

It may be determined whether the first hash matches the second hash (block 506). For example, the bytecode hash 315 may be compared to that generated bytecode hash 324 to determine whether the bytecode hash 315 matches the generated bytecode hash 324. In particular, the first hash may be determined to match the second hash of the first hash is identical to the second hash. For example, the bytecode hash 315 may be determined to match the generated bytecode hash 324 if the bytecode hash 315 is identical to the generated bytecode hash 324.

If the first hash matches the second hash, it may be determined that the received bytecode is the first bytecode (block 508). For example, it may be determined that the bytecode 311 received from the persistent storage 310 correctly corresponds to the first function. In particular, it may be determined that the bytecode 311 received from the persistent storage 310 is identical to the bytecode 311 as initially generated based on the first function and as initially stored on the persistent storage 310. Because the bytecode 311 received from the persistent storage 310 is identical, the bytecode 311 may be considered safe to execute in response to the received second function 242, 302. Accordingly, the serverless computing environment 102 may proceed with injecting the bytecode 311 for execution of the second function 242, 302 at block 414.

If the first hash does not match the second hash, it may be determined that the received bytecode is not the first bytecode (block 510). For example, it may be determined that the bytecode 311 received from the persistent storage 310 does not correctly corresponds to the first function. In particular, it may be determined that the bytecode 311 received from the persistent storage 310 differs from the code 311 as initially generated based on the first function and initially stored on the persistent storage 310. Because the bytecode 311 received from the persistent storage 327 differs, the bytecode 311 may be considered unsafe for execution (e.g., because the bytecode 311 is incorrect and/or was nefariously altered). Therefore, the serverless computing environment 102 may not inject the bytecode 311. Instead, the service computing environment 102 may generate new bytecode based on the second function 242, 302. In certain implementations, the newly-generated bytecode may be stored on a persistent storage 114, 310 of the serverless computing environment 102 (e.g., to replace the bytecode 311). For example, the service computing environment may perform blocks 404, 406 of the method 400 using the newly-generated bytecode.

By detecting alterations of bytecode stored on the persistent storage 114 and preventing execution of altered bytecode, the method 500 may improve the security and accuracy of bytecode injection operations performed according to the method 400. For example, altered bytecode may be changed is the result of nefarious alterations designed to compromise the security of the serverless computing environment 102 and/or functions executed within the serverless computing environment 102. Therefore, by preventing execution of such nefariously-altered bytecode, the method 500 may improve the security of the serverless computing environment 102. Additionally, altered bytecode may be changed is the result of storage errors erroneously altering previously-stored bytecode. Executing such erroneous bytecode may not accurately execute the received second function 242, 302. Therefore, by preventing execution of such erroneously-altered bytecode, the method 500 may improve the accuracy and reliability of bytecode injections performed by the serverless computing environment 102.

Figure 5B:
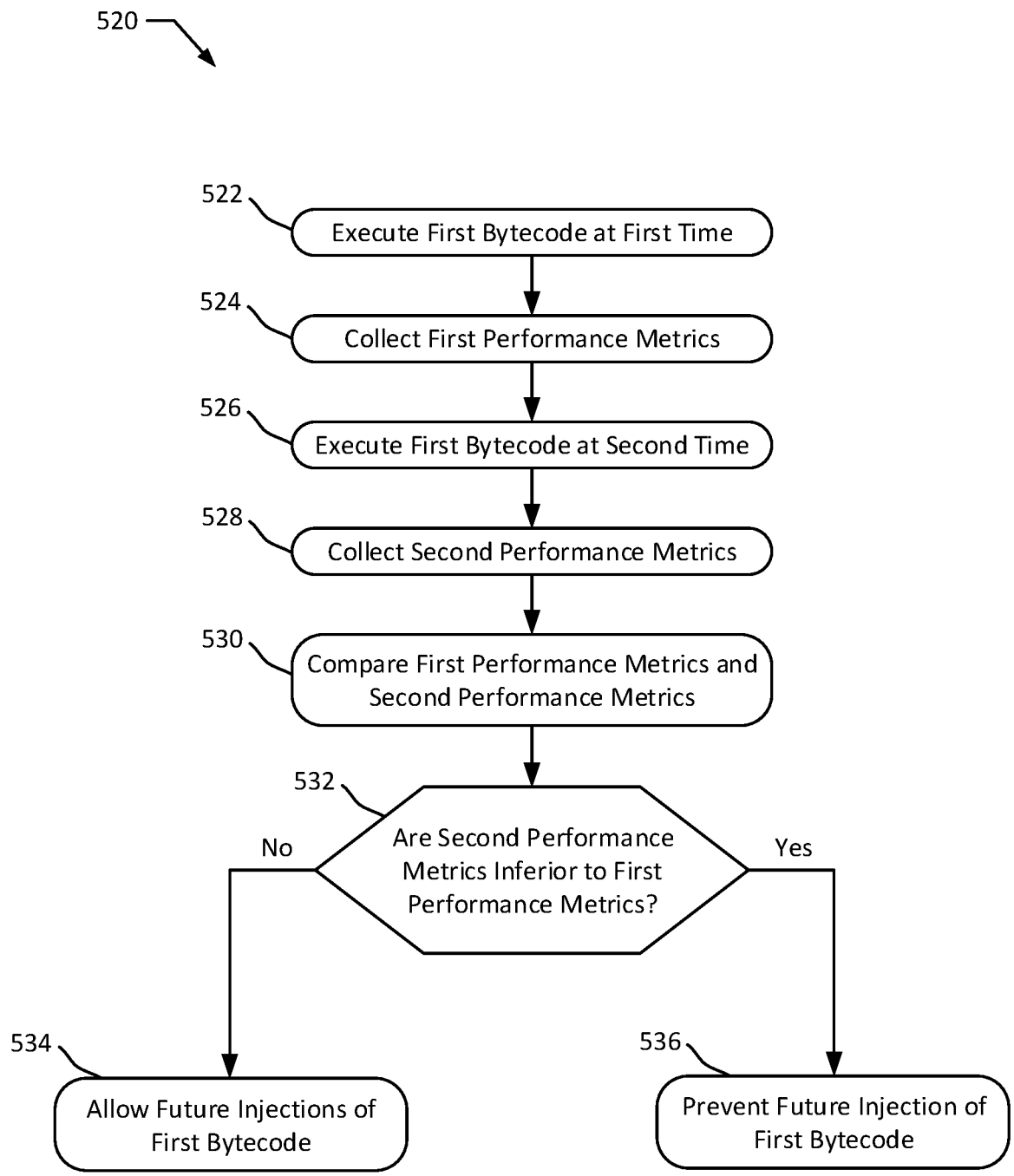
FIG. 5B illustrates a method for comparing bytecode injections according to an exemplary embodiment of the present disclosure.

FIG. 5B illustrates a method 520 for comparing bytecode injections according to an exemplary embodiment of the present disclosure. The method 520 may be performed to compare function executions that utilize bytecode injection to function executions that do not utilize bytecode injection. In particular, the method 520 may be performed to determine whether bytecode injection improves execution performance for particular functions. The method 520 may be implemented on a computer system, such as the system 100. For example, the method 520 may be implemented by the serverless computing environment 102 and in particular may be implemented by the runtime environment 112 (e.g., containers within the runtime environment 112). In certain implementations, the method 520 may be implemented in connection with the method 400. For example, blocks 522 of the method 520 may be performed after generating the first bytecode at block 404 and blocks 526-536 may be performed after injecting the first bytecode at block 414. The method 520 may also be implemented by a set of instructions stored on a computer readable medium that, when executed by a processor, cause the computer system to perform the method 520. For example, all or part of the method 500 may be implemented by the processor(s) 138 and the memory 136. Although the examples below are described with reference to the flowchart illustrated in FIG. 5B, many other methods of performing the acts associated with FIG. 5B may be used. For example, the order of some of the blocks may be changed, certain blocks may be combined with other blocks, one or more of the blocks may be repeated, and some of the blocks described may be optional.

The method 520 may begin with executing a first bytecode at a first time (block 522). For example, the serverless computing environment 102 may execute the first bytecode 116 after receiving the first function 106 at a first time (e.g., after initially receiving the first function 106). First performance metrics may then be collected (block 524). For example, the serverless computing environment 102 may collect first performance metrics 124 regarding the execution of the first bytecode 116 at the first time. In particular, in certain implementations, the container 120 may collect the first performance metrics. As explained above, the first performance metrics 124 may include one or more of a time to initial execution of the first bytecode 116, a total execution time of the first bytecode 116, a processor utilization during execution of the first bytecode 116, and a memory utilization during execution of the first bytecode 116. After the first performance metrics 124 are collected, the first performance metrics 124 may be stored in a persistent storage 114.

The first bytecode may be executed at a second time (block 526). For example, the runtime environment 112 may execute the first bytecode at a second time after injecting the first bytecode 116 at block 414 of the method 400. Second performance metrics may then be collected (block 528). For example, the serverless computing environment 102 (e.g., a secondary container 304 of the container 316 into which the first bytecode was injected) may collect a second set of performance metrics regarding the execution of the first bytecode 116 at the second time. The second performance metrics may include the same metrics included in the first performance metrics 124. In particular, the second performance metrics may include one or more of a time to initial execution of the first bytecode 116, a total execution time of the first bytecode 116, a processor utilization during execution of the first bytecode 116, and a memory utilization during execution of the first bytecode 116.

The first performance metrics and the second performance metrics may be compared (block 530). For example, the serverless computing environment 102 (e.g., a secondary container 304) may compare the first performance metrics 124 and the second performance metrics. In particular, the serverless computing environment may retrieve the first performance metrics 124 from the persistent storage 114 (e.g., while retrieving the first bytecode 116 at block 412) and, after collecting the second performance metrics, may compare the first performance metrics 124 to the second performance metrics. In particular, it may be determined whether the second performance metrics are inferior to the first performance metrics (block 532). For example, the serverless computing environment 102 (e.g., a secondary container 304) may determine whether the second performance metrics are inferior to the first performance metrics 124. To determine whether the second performance metrics are inferior, the serverless computing environment 102 may determine whether one or more of the performance metrics exceed a performance threshold associated with the first performance metrics 124. For example, the performance threshold may be set at the value of one or more of the performance metrics included within the first performance metrics 124. As a specific example, the performance threshold may include a requirement that the time to first execution of the second performance metrics be less than or equal to the time to first execution of the first performance metrics 124. Additionally or alternatively, the performance threshold may include a requirement that the total execution time of the second performance metrics be less than or equal to the total execution time of the first performance metrics 124.

If the second performance metrics do not meet all or part of the requirements included within the performance threshold, the second performance metrics may be determined to be inferior to the first performance metrics 124. In such instances, future injection of the first bytecode may be prevented (block 536). For example, the serverless computing environment 102 (e.g., a secondary container 304) may prevent future injection of the first bytecode 116. In certain implementations, future injection of the first bytecode 116 may be prevented by deleting the first bytecode 116 from the persistent storage 114. Additionally or alternatively, future injection of the first bytecode 116 may be prevented by storing an indication that the first bytecode 116 should not be injected. For example, the indication may be stored as part of the metadata of the first bytecode 116 in the persistent storage 114. Additionally or alternatively, the indication may be stored in association with the function 106 (e.g., as metadata associated with the function 106).

If the second performance metrics do meet all of the requirements included within the performance threshold (e.g., "exceed" the performance threshold), the second performance metrics may be determine to not be inferior to the first performance metrics 124. In such instances, future injections of the first bytecode may be allowed (block 534). For example, the serverless computing environment 102 (e.g., a secondary container 304) may allow future injection of the first bytecode 116. In certain implementations, future injection of the first bytecode 116 may be allowed by storing an indication that injection of the first bytecode 116 has been tested and verified (e.g., by performing blocks 522-532). The indication may be stored in association with (e.g., may be included in metadata associated with) one or both of the first bytecode 116 and the function 106 within the persistent storage 114. In certain implementations, performance metrics for future injections may not be collected. For example, when retrieving the first bytecode 116, a secondary container may identify the indication that injection of the first bytecode 116 has been tested and verified and, in response, may not collect performance metrics after injecting the first bytecode. In still further implementations, performance metrics for future injections may only be periodically collected, rather than collected for every injection of the first bytecode 116. For example, performance metrics may be collected for ever third, fifth, tenth, or hundredth injection or may be collected at particular time intervals (e.g., for one injection occurring every minute, hour, day, or week).

By performing the method 520, the serverless computing environment 102 may be able to adaptively identify and select when injection of bytecode 116 is advantageous. For example, in certain instances (e.g., for simple or short functions), it may be faster to generate the bytecode 116 each time than to retrieve and inject previously-stored bytecode. In such instances, the second performance metrics may be inferior (e.g., the time to initial execution may be longer) than the first performance metrics 124. Therefore, future injections of the bytecode 116 may be prevented, allowing for the bytecode to be generated each time. However, in instances where generating the bytecode 116 each time is not faster (e.g., for complicated or longer functions), the second performance metrics may not be inferior (e.g., the time to initial execution may be shorter) than the first performance metrics. Therefore, future injections of the bytecode 116 may be allowed, enabling the time and latency savings and reduced computing resource utilization of the bytecode injection where appropriate. In this way, the method 520 enables adaptive injection of bytecode only for functions that benefit from (e.g., execute faster as a result of) having previously-generated bytecode injected before execution.

Figure 6:
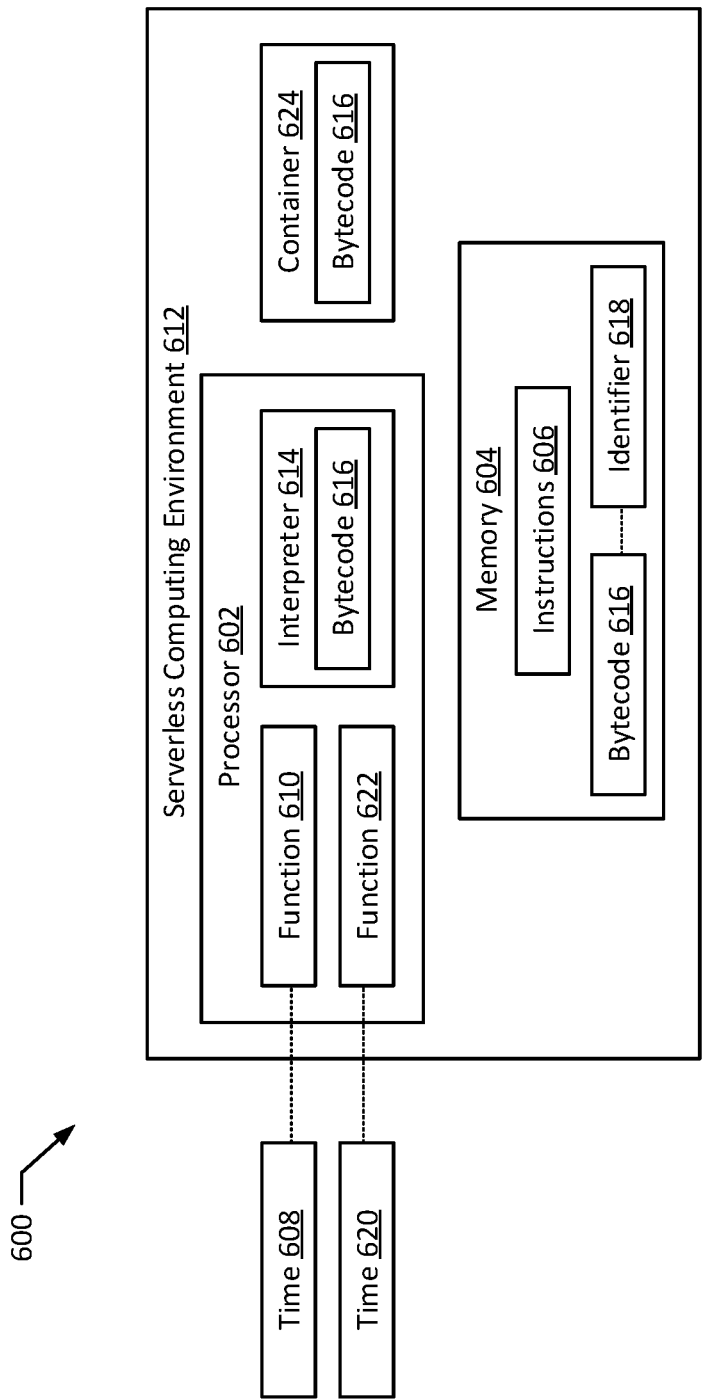
FIG. 6 illustrates a system according to an exemplary embodiment of the present disclosure.

FIG. 6 illustrates a system 600 according to an exemplary embodiment of the present disclosure. The system 600 includes a processor 602 and a memory 604. The memory 604 stores instructions 606. When executed by the processor 602, the instructions 606 may cause the processor 602 to receive, at a first time 608, a first function 610 for execution within a serverless computing environment 612 and generate, by an interpreter 614, a first bytecode 616 based on the first function 610. The instructions 606 may also cause the processor 602 to store the first bytecode 616 in association with an identifier 618 of the first function 610 and receive, at a second time 620 after the first time 608, a second function 622 for execution within the serverless computing environment 612. The instructions 606 may further cause the processor 602 to identify the second function 622 as corresponding to the first function 610, retrieve the first bytecode 616, and inject the first bytecode into a container for execution of the second function.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving, at a first time, a first function for execution within a serverless computing environment;
generating, by an interpreter, a first bytecode based on the first function;
storing the first bytecode in association with an identifier of the first function;
receiving, at a second time after the first time, a second function for execution within the serverless computing environment;
identifying the second function as corresponding to the first function by:
generating a partial bytecode based on a portion of the second function; and
comparing the first bytecode to the partial bytecode; and
injecting the first bytecode into a container for execution of the second function.

2. The method of claim 1, further comprising:
generating a first hash based on the first function;
storing the first hash in association with the first bytecode; and
generating a second hash based on the second function,
wherein identifying the second function as corresponding to the first function further comprises:
comparing the first hash and the second hash; and
determining that the first hash matches the second hash, and
wherein the second function is identified as corresponding to the first function in response to determining that the first hash matches the second hash.

3. The method of claim 1, wherein comparing the first bytecode to the partial bytecode further comprises determining that the partial bytecode matches at least a portion of the first bytecode.

4. The method of claim 1, further comprising:
generating a first hash based on at least a portion of the first bytecode; and
storing the first hash in association with the first bytecode,
wherein comparing the first bytecode to the partial bytecode further comprises:
generating a second hash based on the partial bytecode;

comparing the first hash and the second hash; and
determining that the first hash matches the second hash, and wherein the second function is identified as corresponding to the first function in response to determining that the first hash matches the second hash.

5. The method of claim 1, further comprising:
identifying an identifier associated with the first bytecode, the identifier identifying the first function; and
determining that the identifier matches the second function, wherein the second function is identified as corresponding to the first function in response to determining that the identifier matches the second function.

6. The method of claim 1, further comprising, prior to receiving the second function:
generating a first hash based on the first bytecode;
storing the first hash in association with the first bytecode; and
retrieving the first bytecode by:
receiving a retrieved bytecode and the first hash;
generating a second hash based on the retrieved bytecode;
comparing the first hash to the second hash;
determining that the second hash matches the first hash; and
determining that the retrieved bytecode is the first bytecode, wherein the first bytecode is injected in response to determining that the retrieved bytecode is the first bytecode.

7. The method of claim 1, further comprising, prior to receiving the second function:
executing the first bytecode; and
receiving first performance metrics regarding the execution of the first bytecode,
after injecting the first bytecode into the container for execution of the second function:
executing the first bytecode;
receiving second performance metrics regarding execution of the first bytecode; and
comparing the second performance metrics to the first performance metrics.

8. The method of claim 7, further comprising:
determining whether the second performance metrics exceed or are equivalent to a performance threshold associated with the first performance metrics;
allowing future injection of the first bytecode in response to determining that the second performance metrics exceed or are equivalent to the performance threshold; and
preventing future injection of the first bytecode in response to determining that the second performance metrics do not exceed and are not equivalent to the performance threshold.

9. A system comprising:
a processor; and
a memory storing instructions which, when executed by the processor, cause the processor to:
receive, at a first time, a first function for execution within a serverless computing environment;
generate, by an interpreter, a first bytecode based on the first function;
store the first bytecode in association with an identifier of the first function;
receive, at a second time after the first time, a second function for execution within the serverless computing environment;
identify the second function as corresponding to the first function;
inject the first bytecode into a container for execution of the second function;
receive performance metrics regarding execution of the second function; and
determine, based on the performance metrics, whether to allow or prevent future injection of the first bytecode.

10. The system of claim 9, wherein the performance metrics comprises one or more of:
a time to initial execution of the first bytecode,
a total execution time of the first bytecode,
a processor utilization during execution of the first bytecode, and
a memory utilization during execution of the first bytecode.

11. The system of claim 9, wherein the instructions, when executed, cause the processor to:
generate a first hash based on the first function;
store the first hash in association with the first bytecode; and
generate a second hash based on the second function,
wherein identifying the second function as corresponding to the first function further comprises:
comparing the first hash and the second hash; and
determining that the first hash matches the second hash, wherein the second function is identified as corresponding to the first function in response to determining that the first hash matches the second hash.

12. The system of claim 9, wherein the instructions, when executed, cause the processor to generate a partial bytecode based on a portion of the second function, wherein identifying the second function as corresponding to the first function further comprises comparing the first bytecode to the partial bytecode.

13. The system of claim 12, wherein comparing the first bytecode to the partial bytecode further comprises determining that the partial bytecode matches at least a portion of the first bytecode.

14. The system of claim 12, wherein the instructions, when executed, cause the processor to:
generate a first hash based on at least a portion of the first bytecode; and
store the first hash in association with the first bytecode,
wherein comparing the first bytecode to the partial bytecode further comprises:
generating a second hash based on the partial bytecode;
comparing the first hash and the second hash; and
determining that the first hash matches the second hash, wherein the second function is identified as corresponding to the first function in response to determining that the first hash matches the second hash.

15. The system of claim 9, wherein identifying the second function as corresponding to the first function further comprises:
identifying an identifier associated with the first bytecode, the identifier identifying the first function; and
determining that the identifier matches the second function, and
wherein the second function is identified as corresponding to the first function in response to determining that the identifier matches the second function.

16. The system of claim 9, wherein prior to receiving the second function; the instructions, when executed, cause the processor to:
generate a first hash based on the first bytecode; and store the first hash in association with the first bytecode, wherein retrieving the first bytecode further comprises:
receiving a retrieved bytecode and the first hash;
generating a second hash based on the retrieved bytecode;
comparing the first hash to the second hash;
determining that the second hash matches the first hash; and
determining that the retrieved bytecode is the first bytecode, wherein the first bytecode is injected in response to determining that the retrieved bytecode is the first bytecode.

17. The system of claim 9, wherein the instructions, when executed, cause the processor to determine whether to allow or prevent future injection of the first bytecode by:
comparing the performance metrics to a performance threshold associated with the first function,
wherein the instructions, when executed, further causes the processor to:
determine that the second performance metrics do not exceed the performance threshold; and
prevent future injection of the first bytecode.

18. The system of claim 9, wherein the instructions, when executed, cause the processor to determine whether to allow or prevent future injection of the first bytecode by:
comparing the performance metrics to a performance threshold associated with the first function,
wherein the instructions, when executed, further cause the processor to:
determine that the second performance metrics exceed or are equivalent to the performance threshold; and
allow future injection of the first bytecode.

19. A non-transitory, computer-readable medium storing instructions which, when executed by a processor, cause the processor to:
receive, at a first time, a first function for execution within a serverless computing environment;
generate, by an interpreter, a first bytecode based on the first function;
store the first bytecode in association with an identifier of the first function;
receive, at a second time after the first time, a second function for execution within the serverless computing environment;
identify the second function as corresponding to the first function;
inject the first bytecode into a container for execution of the second function;
receive performance metrics regarding execution of the second function; and determine, based on the performance metrics, whether to allow or prevent future injection of the first bytecode.

* * * * *